US006041549A

United States Patent [19]

Schust et al.

[11] Patent Number: 6,041,549

[45] Date of Patent: Mar. 28, 2000

[54] DEVICE FOR LINKING A WINDOW LIFTER ARM TO THE MOVABLE WINDOW PANE OF A MOTOR VEHICLE

[75] Inventors: Gerhard Schust, Weidhausen; Gabriele Lange, Marktrodach, both of Germany; Daryl Elms, Staffordshire, United Kingdom

[73] Assignee: Brose Fahrzeugteile GmbH & Co. KG, Coburg, Germany

[21] Appl. No.: 08/973,809

[22] PCT Filed: Jun. 4, 1996

[86] PCT No.: PCT/DE96/01049

§ 371 Date: Jun. 18, 1998

§ 102(e) Date: Jun. 18, 1998

[87] PCT Pub. No.: WO96/41726

PCT Pub. Date: Dec. 27, 1996

[30] Foreign Application Priority Data

Jun. 9, 1995 [DE] Germany .......................... 195 21 121

[51] Int. Cl.$^{7}$ ........................................ B60J 1/00

[52] U.S. Cl. ........................................ 49/375

[58] Field of Search ........................ 49/375, 374, 348, 49/349, 350, 351

[56] References Cited

U.S. PATENT DOCUMENTS

| | | | |
|---|---|---|---|
| 3,282,013 | 11/1966 | Boicey | 52/624 |
| 4,475,314 | 10/1984 | Faix et al. | 49/374 |
| 4,848,032 | 7/1989 | Ballor et al. | 49/350 |
| 4,866,895 | 9/1989 | Hlavati | 52/208 |
| 5,101,596 | 4/1992 | Moore | 49/351 |
| 5,243,785 | 9/1993 | Nieboer et al. | 49/375 |
| 5,546,704 | 8/1996 | Marnoka | 49/375 |
| 5,622,005 | 4/1997 | Ochenski et al. | 49/375 |
| 5,778,599 | 7/1998 | Saito | 49/375 |

FOREIGN PATENT DOCUMENTS

| | | |
|---|---|---|
| 3108244 | 6/1982 | Germany . |
| 2923039 | 8/1985 | Germany . |
| 3608446 | 9/1987 | Germany . |
| 6-135228 | 5/1994 | Japan . |
| 438 | 8/1994 | Japan . |
| 6-221052 | 8/1994 | Japan . |
| 592 | 11/1994 | Japan . |
| 2287743 | 9/1995 | United Kingdom . |

*Primary Examiner*—Jerry Redman
*Attorney, Agent, or Firm*—Christie, Parker & Hale, LLP

[57] ABSTRACT

A device for connecting at least one window lifter arm to a two-sided displaceable window pane in a motor vehicle. The device includes a profiled guiding section adapted to be fixed to one edge of such window pane, a slider slidably mounted in the profiled guiding section and adapted to be fixed to the at least one window lifter arm, at least two stops molded in the profiled guiding section for engaging said one edge of such window pane during assembly, at least two spaced apart clamping areas molded in the profiled guiding section and adapted to contact one side of the window pane, at least two separate clamping jaws supported on the profiled guiding section, each clamping jaw being associated with an opposing different one of said at least two clamping areas and being adapted to contact the other side of the window pane, at least two sets of supporting points being formed between each of the separate clamping jaws and the opposing clamping area, and tensioning means to tension the window pane between the at least two clamping areas and the associated at least two separate clamping jaws.

17 Claims, 4 Drawing Sheets

DEVICE FOR LINKING A WINDOW LIFTER ARM TO THE MOVABLE WINDOW PANE OF A MOTOR VEHICLE

BACKGROUND

The invention relates to a device for connecting a window lifter arm to a movable window pane of a motor vehicle.

DE 31 08 244 A1 describes a snap-fitting connecting device between a window pane of a motor vehicle and a window pane lifter. The window pane lifter consists of two interconnected channel-like profiled sections of which one encloses an area of the lower edge of the pane and is fixed to same. The other downwardly open profiled section supports at its ends inwardly aligned hooks which can enter into engagement with projections of angled elements of the lifter device whereby a keyed connection can be produced. The connecting elements are snapped in forcefully by moving the window pane against the upper stop position whereby at the same time, the window pane is automatically aligned in the frame structure and additional manual adjustments are not necessary during fitting.

Since however the profile-like coupling element has to be pre-fitted on the lower edge of the pane, the thicker structure resulting therefrom normally leads to difficult insertion of the window pane into the door shaft. As a result of the necessarily missing seal in this area to accommodate the thicker structure of the pane, during fitting, there is always the risk of damage to the paintwork. A further problem is in the small tolerances which are required in the snap-in area of the coupling element in order to avoid operating noises when moving the window lifter.

A variation which is very similar to that described above and having similar disadvantages is known from the JP A 6-135228. The elements fixed on the lower edge of the window pane have at their free ends conical abutment-like areas associated with the U-profiled connecting elements of the window lifter. They also have inclined guides with which the conical areas of the elements fixed on the window pane can enter into engagement. When bringing the connecting elements together, the arms of the U-profiled sections are elastically spread out. At the end of the fitting process, inwardly aligned hooks provided at the free ends of the U profiled sections engage over the projections of the conical abutment-like areas of the other elements. However there is the drawback that the part of the connecting element fixed on the window pane and angled away from the edge of the pane shortens the lift which can theoretically be carried out.

From DE 29 23 039 C2 a lift rail is known which is fixed by adhesive in the area of the lower edge of the window pane whereby the sliders of the lever arms of a cross-arm window lifter are displaceable guided in the lower part of the lift rail designed as a C section. The connection between the window lifter and the window pane is produced by screw connections. Also, the fitting of this lifter rail is provided outside of the door.

U.S. Pat. No 4,866,895 describes a connecting device with a one-piece plastics part which can be attached in the area of the lower edge of the pane and clips in through a hole in the pane. This plastics part has on both sides resilient wings associated with recesses in the lifter rail in which the wings engage at the end of assembly. The drawback with this solution is in the comparatively weak load-bearing ability of the connecting device since the plastics is inclined to flow at high temperatures and can thus only transfer weak draw forces.

The connecting device known from JP A 6 221052 is likewise a plastics part which can be fixed by clipping into a hole in the lower edge of the pane. Fixing the lifter rail is carried out by a screw which is screwed through the plastics part and through the hole in the pane. This solution has the drawback that adjusting the window pane is riot possible during its assembly through the connecting elements.

SUMMARY

According to an embodiment of the invention, it is possible to provide a device for connecting a window lifter arm to the displaceable window pane of a motor vehicle which, through simple means, allows the fitting and simultaneous adjustment of a window pane inside the vehicle door wherein the window pane carries no prefitted add-on parts.

According to one embodiment of the invention, a device is provided for connecting at least one window lifter arm to a two-sided displaceable window pane in a motor vehicle. The device includes a profiled guiding section adapted to be fixed to one edge of such window pane, a slider slidably mounted in the profiled guiding section and adapted to be fixed to the at least one window lifter arm, at least two stops molded in the profiled guiding section for engaging said one edge of such window pane during assembly, at least two spaced apart clamping areas molded in the profiled guiding section and adapted to contact one side of the window pane, at least two separate clamping jaws supported on the profiled guiding section, each clamping jaw being associated with an opposing different one of said at least two clamping areas and being adapted to contact the other side of the window pane, at least two sets of supporting points being formed between each of the separate clamping jaws and the opposing clamping area, and tensioning means to tension the window pane between the at least two clamping areas and the associated at least two separate clamping jaws.

According to another embodiment, not only are the guide channels or guide slides, with which the sliders or rollers fixed at the ends of the lifter are in keyed, displaceable connection, molded on the profiled guiding section, or guide profile, but in addition, at least two spaced clamping areas are integrated in one piece. A separate clamping jaw and a tension means such as a screw are associated with the clamping area. The window pane is inserted between the clamping areas of the profiled guiding section and the separate clamping jaws until its edge strikes against associated stops in the profiled guiding section. After tensioning the connecting device, the window pane is fixed with friction engagement.

The profiled guiding section can, like the separate clamping jaws, be made for example of steel as a punched/stamped part. In this case, an elastic material with high coefficient of friction is mounted in the gap between the clamping area and clamping jaw and encloses the edge of the pane on both sides in this area. Rubber has proved particularly suitable for this.

The profiled guiding section can however also be formed as a plastics part wherein at least the clamping areas ought to be formed in the ousert technique in order to be able to transfer the forces which occur.

A simple secure fitting is then guaranteed if the clamping jaw mounted on the side of the guide rail and which rests directly on the surface of the window pane protrudes beyond the contour of the remaining areas above the stops of the profiled guiding section. It is then avoided that the profiled guiding section can enter into contact outside of the clamping areas with the side faces of the pane which strongly reduces the risk of the window breaking or unsatisfactory fixing. If it is important to ensure the window is fixed with the smallest possible structural thickness, then the clamping areas of the profiled guiding section should be molded on the profiled guiding section above the guide area. It is thereby possible to place the guide area at least in part underneath the edge of the pane.

When connecting a window pane with a full-length straight horizontal edge, the clamping axis formed by the supporting points between the profiled guiding section and clamping jaws, as well as the supporting points between window pane and profiled guiding section or clamping jaws, and on which the tension screw also lies, runs substantially vertical. The designated clamping axis can however also run substantially horizontally if the contour of the window pane on which the profiled guiding section is to be connected runs vertically. With a cut in the lower edge of the pane to form a fixing wing which is provided for fixing a suitable projection, such a connection can take place without a loss of lift height.

A further preferred variation of the invention for a cross-arm window lifter proposes to mount only the first clamping area on the edge of the profiled guiding section which lies on the side of the guide slide for a slider of a lever arm or—with the presence of two guide slides—on the side of the longer guide slide. The second clamping area is mounted between the guide slide and articulated point of the other lever arm or between the two guide slides. The length of the connecting device according to the invention is thereby restricted to the absolute required dimension.

In order to ensure a simplified fitting of the window pane during assembly, the profiled guiding section supports a spring acting in the displacement of the window pane wherein the spring should have the largest possible distance from the center of gravity of the window pane. The spring forms one of the two bearing points for the edge of the pane and is not, or not so strongly deformed by the weight of the pane occurring there that the edge of the pane lies on the stop.

In order to build on the desired advantages of the spring, the structural design of the window lifter system should be such that the pane contour lying above the spring enters into the window frame before the contour lying on the other side. With a further increase in the pressure, the spring is deformed increasingly until also the pane contour of the other side adjoins the frame. The clamping connections in clamping areas can then be tensioned which completes the assembly and adjustment process. The spring path is to be preselected according to the tolerances expected.

The spring is preferably mounted directly in the clamping area. It can, for example, be formed as a leaf spring and can be fixed on special features of the profiled guiding section, such as stop wings, wherein these features serve at the same time as end stops. There is, however, also the possibility of integrating the spring in the base area of U-shaped rubber element which engages around the lower edge of the pane and is supported on the profiled guiding section.

BRIEF DESCRIPTION OF THE DRAWINGS

The invention will now be explained with reference to the embodiments illustrated in the drawings in which.

DETAILED DESCRIPTION

Figure 1:
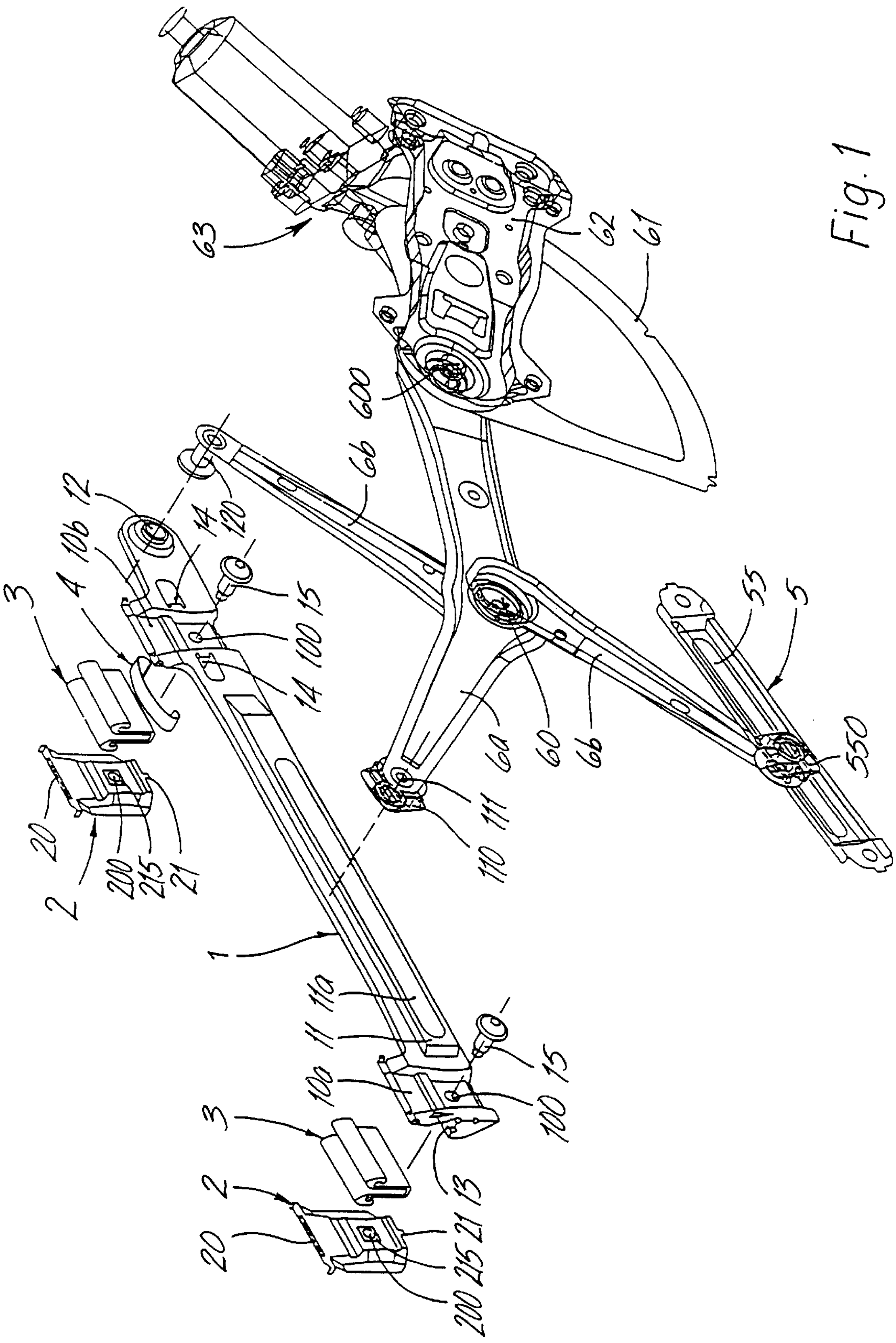
FIG. 1 is an exploded perspective view of a variation of the connecting device according to the invention with a cross-arm window lifter.
Figure 2:
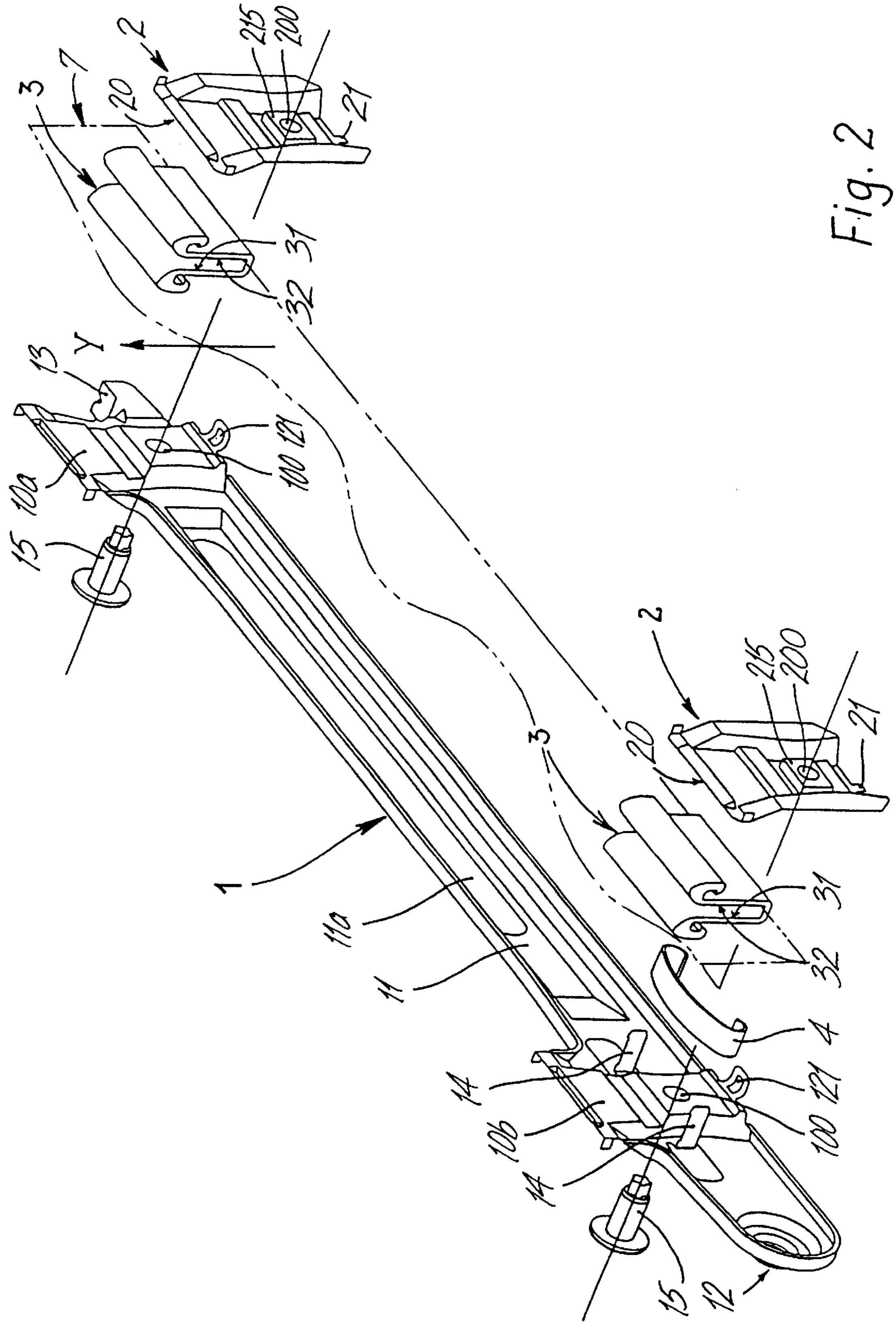
FIG. 2 is an illustration on a larger scale of the connecting device of FIG. 1 in a view turned by 180 degs.

According to the embodiment of the connecting device according to the invention and shown in FIGS. 1 and 2, the device consists of a profiled guiding section, or guide profile, 1 with a guide channel 11 for a slider 110 of one lever arm 6*a*, and a bearing socket 12 for a bearing bolt 120 of another lever arm 6*b*, two separate clamping jaws 2, associated with the clamping areas 10*a*, 10*b* which are molded in one piece on the profiled guiding section 1, and screws 15 for tensioning the clamping jaws 2 and clamping areas 10*a*, 10*b*. Furthermore profiled rubber sections 3 are provided which bear between the clamping areas 10*a*, 10*b* and the clamping jaws 2 and are fitted on the upper free ends thereof.

The profiled guiding section 1 illustrated is a one-piece stamped/impressed part of steel and integrates in addition to the function areas already mentioned, namely clamping areas 10*a*, 10*b*, guide channel 11 and bearing socket 12, also includes stops 13, 14 for the edge of the pane as well as the eyelets 121 (FIG. 2), which form in conjunction with the noses 21, an anti-rotation lock for the separate clamping jaws 2. Whereas the stop 13 is designed as an imprinted area of the profiled guiding section 1, the stop 14 consists of a pair of wings which are bent out of the material in the direction of the separate clamping jaw 2 and flank of the clamping area 10*b* on each side. They serve at the same time to hold a leaf spring 4 which is curved towards the window pane and which serves as a stop for the lower edge of the pane.

Above the stops 13, 14, the clamping areas 10*a*, 10*b* of the profiled guiding section 1 protrude furthest in the direction of the separate clamping jaws 2. By using profiled rubber sections 3 whose inner faces 31, 32 act on the window pane as clamping faces, the actual clamping face lies in front of all the other areas of the profiled guiding section 1. It is thereby ensured that the window pane is only clamped in the clamping area 10*a*, 10*b*. Other contacts with the profiled guiding section 1 could lead to assembly errors or even to breakage of the window pane.

The separate clamping jaws 2 can also be formed as imprinted parts and have a front clamping face 20. Between the nose 21 and the clamping face 20 is a nut 215 for example, a welded nut or a pressed-in nut, having a threaded opening 200 in which the screw 15 is turned so that it passes through the opening 100 underneath the clamping area 10*a*, 10*b*. On tightening the screw connection 15, 215, the clamping jaw 2 is supported in the area of its nose 21 on the profiled guiding section 1. On the other hand, the clamping areas 10*a*, 10*b* and 20 are pressed with the interposition of the profiled rubber section 3 onto the surfaces of the window pane. The clamping axis formed by the clamping areas 10*a*, 10*b*, 20 and the screw 15 or nut 215 and the eyelet 121 and nose 21 is associated with a pane edge running substantially orthogonal thereto on which the clamping fastening is to take place.

The cross arm window lifter consists of the base plate 62, a motor gear unit 63 mounted thereon whose drive pinion (not shown) engages in the teeth of a tooth segment 61 which is likewise fixed on the base plate 62 to swivel in the rotary joint 600. The toothed segment 61 is in fixed connection with the lever arm 6*a* whose opposite end supports on a bolt 111 and the slider 110 which is mounted displaceable in the guide channel 11 wherein the bolt 111 supporting the slider 110 passes through a slide area 11*a*. The other lever arm 6*b*, having a slider 550 mounted in a guide channel 55 of a guide rail 5, is mounted in a rotary joint 60 and locks the bearing bolt 120 on the other side in the bearing socket 12 of the profiled guiding section 1.

In order to ensure a simplified fitting of the window pane during assembly, the profiled guiding section supports spring 4 acting in the displacement of the window pane wherein the spring 4 should have the largest possible distance from the center of gravity of the window pane. The spring 4 forms one of the two bearing points for the edge of the pane and is not, or not so strongly deformed by the weight of the pane occurring there that the edge of the pane lies on the stop.

In order to build on the desired advantages of the spring, the structural design of the window lifter system should be such that the pane contour lying above the spring 4 enters into the window frame before the contour lying on the other side. With a further increase in the pressure, the spring 4 is deformed increasingly until also the pane contour of the other side adjoins the frame. The clamping connections in clamping areas 10*a*, 10*b* can then be tensioned which completes the assembly and adjustment process. The spring path is to be preselected according to the tolerances expected.

The spring is preferably mounted directly in the clamping area 10*b*. It can, for example, be formed as a leaf spring and can be fixed on special features of the profiled guiding section, such as stop wings 14, wherein these features serve at the same time as end stops. There is, however, also the possibility of integrating the spring 4 in the base area of U-shaped rubber element 3 which engages around the lower edge of the pane and is supported on the profiled guiding section.

Figure 3A:
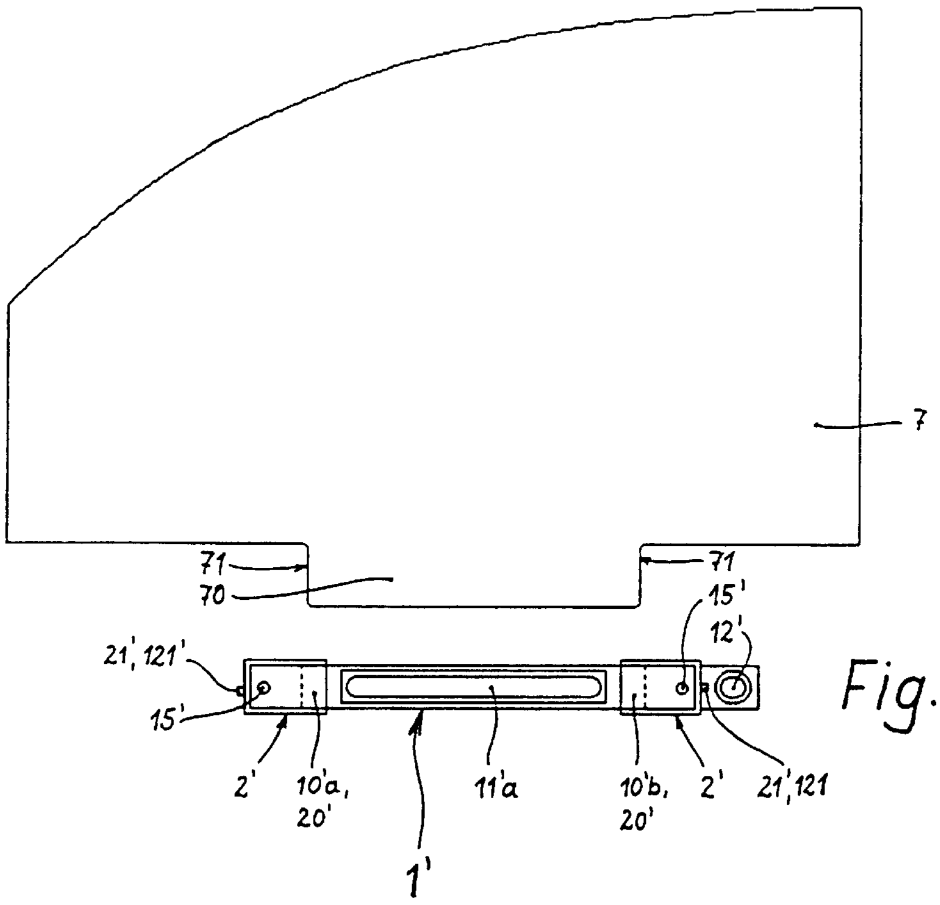
FIG. 3*a* is a diagrammatic illustration of a connecting device with horizontally aligned clamping axis and window pane with a fixing wing.
Figure 3B:
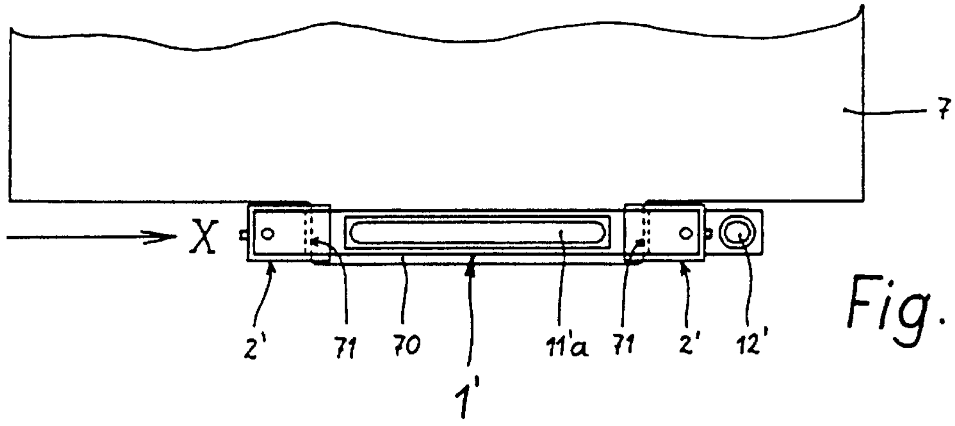
FIG. 3*b* is a connecting device according to FIG. 3*a* after fitting.

FIGS. 3*a* and 3*b* show in diagrammatic illustration a variation of the invention with a clamping axis (formed by the parts or areas 21', 121', and 15' and 10'*a*, 10'*b*, 20') which run in the longitudinal axis of the profiled guiding section 1', thus horizontally. Vertically aligned edges 71 of the fixing wing 70, which extends down at the window pane 7, are associated with the clamping areas 10'*a*, 10'*b*, 20'. Apart from the clamping axes being turned by 90 degrees, the profiled guiding section 1' corresponds to the profiled guiding section 1 described in FIGS. 1 and 2. Also, here the clamping area 10'*b* is mounted between the guide channel 11'*a* and the bearing socket 12' and the other clamping area 10'*a* is mounted on the opposite end of the profiled guiding section 1'.

It is also possible to use here the spring (spring 4 in FIGS. 1 and 2) which lifts the window pane 7 by a preselected amount and when the window pane 7 enters the door frame is deformed until the ideal pane position is reached. Only then are the tension means (screws 15') tightened.

Figure 4:
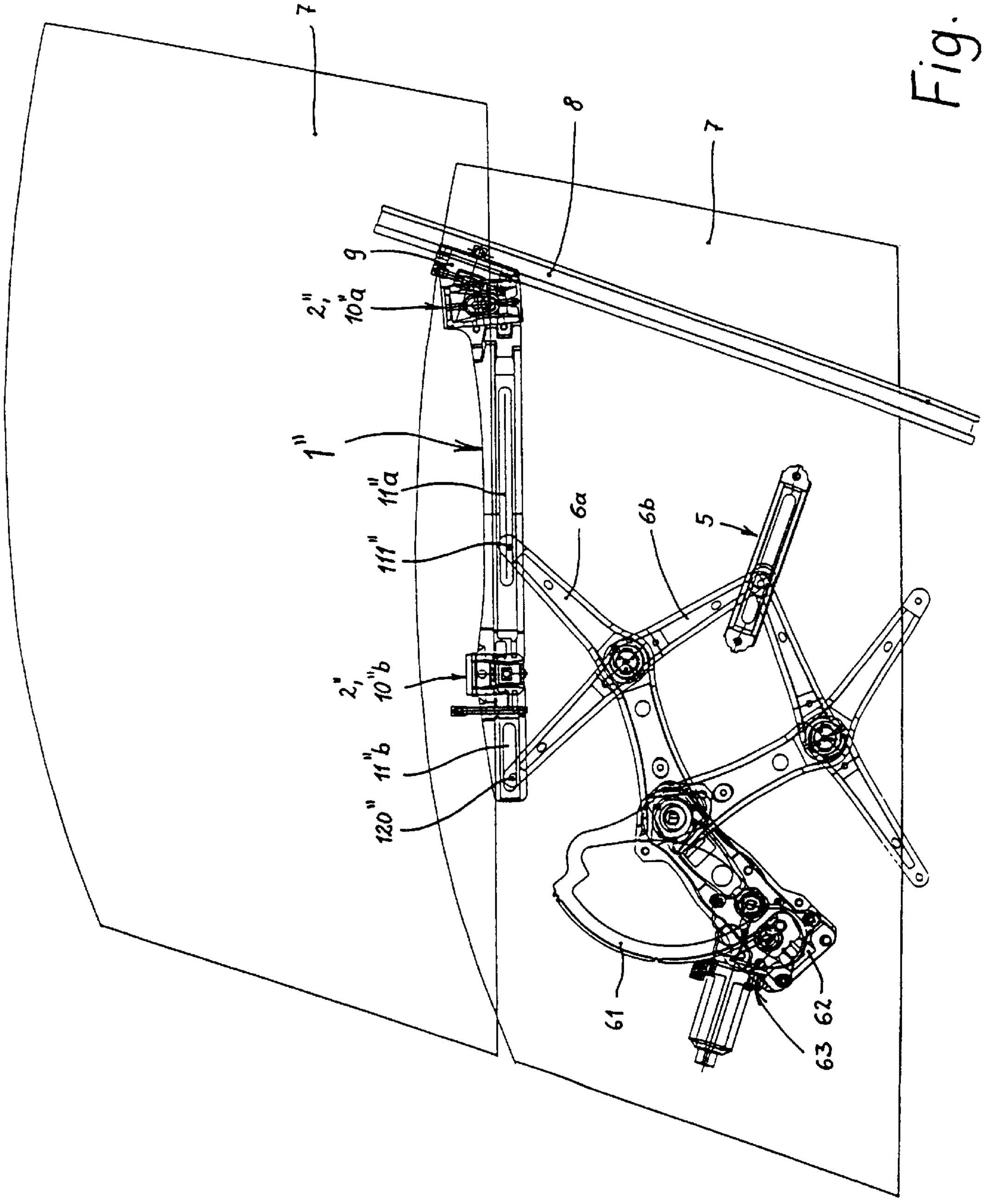
FIG. 4 is a view of a connecting device with two guide slides and a slider which engages in a guide rail running in the draw direction with the device shown in a raised and a lowered position.

The variation of the invention of FIG. 4 shows a connecting device with two guide areas 11"*a*, 11"*b* between which the clamping area 10"*b* is mounted. The other clamping area 10"*a* is connected to a slider 9 which engages positively and movably in a guide rail 8 extending along the displacement path of the window pane 7. Thus the kinematics of the pane movement is determined not by the cross arm window lifter but by the guide rail 8. In the uppermost pane position the bolt 120" of the lever arm 6*b* is located on the left stop of the slide 11"*b* and is moved in the direction of the right stop when the window pane 7 is moved into the lower position.

The profiled guiding section can, like the separate clamping jaws, be made for example of steel as a punched/stamped part. In this case, an elastic material with high coefficient of friction is mounted in the gap between the clamping area and clamping jaw and encloses the edge of the pane on both sides in this area. Rubber has proved particularly suitable for this, for example profiled rubber elements 3 (FIGS. 1 and 2).

The profiled guiding section can however also be formed as a plastics part wherein at least the clamping areas ought to be formed in the outset technique in order to be able to transfer the forces which occur.

The embodiments described above refer only to cross-arm window lifters, but a connecting device according to the various embodiments of the invention can however also be used for a single-arm window lifter. Only the already described use of a spring element for the purpose of automatically adjusting the window pane in a door frame is not suitable with a single-arm window lifter.

We claim:

1. A device for connecting at least one window lifter arm to a displaceable window pane, having two sides, of a motor vehicle comprising:

a profiled guiding section adapted to be fixed in an area of an edge of the window pane;

a slider, adapted to be fixed to the at least one window lifter arm swivelling about an axis, mounted for displacement in the profiled guiding section;

at least two spaced apart clamping areas adapted to rest on one side of the window pane and which are molded in one piece on the profiled guiding sections;

at least two spaced apart stops molded in one piece on the profiled guiding section and adapted to enter into engagement with the lower edge of the window pane during assembly;

at least two separate clamping jaws, each of which rests on the other side of the window pane and is associated with an opposing different one of said at least two clamping areas on the profiled guiding section; and tension means to tension the clamping areas and the clamping jaws with the window pane;

wherein each of the at least two separate clamping jaws has two supporting points, one supporting point on one side on the profiled guiding section and the other supporting point on the other side on the window pane, and wherein the tension means engages between the two supporting points.

2. The device according to claim 1, wherein the clamping areas of the profiled guiding section protrude over a contour formed by the remaining areas of the profiled guiding section above the stops towards the opposing clamping jaws.

3. The device according to claim 1, wherein each clamping area of the profiled guiding section has a support bearing of elastic material with a high coefficient of friction relative to the window pane and has a clamping surface that protrudes over a contour formed by the remaining areas of the profiled guiding section.

4. The device according to claim 3 wherein the elastic material comprises rubber.

5. The device according to claim 1, wherein the tension means are screws.

6. The device according to claim 5, wherein a clamping axis is formed by one set of the supporting points on one side and the other set of supporting points on the other side and an engagement point of the tension screw in between is aligned substantially vertically wherein the contour of the window pane runs substantially horizontally in the clamping area.

7. The device according to claim 1, wherein a clamping axis formed by one set of the supporting points on one side and the other set of supporting points on the other side and an engagement point of the tension screw in between is aligned substantially horizontally wherein a contour of the window pane in the clamping area runs substantially vertically.

8. The device according to claim 1, adapted for use with a cross-arm window lifter having two arms, and further comprising a guide area for a first one of the two arms and a bearing socket or guide area for a second one of the two arms, wherein one of the two clamping areas lies between the guide area of the associated end of the lever arm and the bearing socket or the guide area of the associated end of the second lever arm.

9. The device according to claim 1, wherein the profiled guiding section is a punched or stamped part.

10. The device according to claim 9, wherein the profiled guiding section is a steel part.

11. The device according to claim 1, wherein each of the at least two separate clamping jaws comprises a clamping face and a nose and the profiled guiding section further comprises at least two eyelets, each eyelet adapted to engage the nose of a different one of the at least two separate clamping jaws, thereby supporting the separate clamping jaw.

12. The device according to claim 11, wherein the two sets of supporting points between each separate clamping jaw and the profiled guiding section comprise a first set of supporting points comprising the clamping face of the separate clamping jaw and the opposing clamping area of the profiled guiding section, and a second set of supporting points comprising the nose of the separate clamping jaw and the eyelet adapted to engage said nose.

13. The device of claim 1, further comprising a spring mounted to one of the at least two spaced apart stops and adapted to contact the lower edge of the window pane during assembly.

14. The device of claim 1, wherein the tension means is located below one of the at least two spaced apart stops.

15. A device for connecting at least one window lifter arm to a two-sided displaceable window pane in a motor vehicle, comprising:

a profiled guiding section adapted to be fixed to one edge of such window pane;

a slider slidably mounted in the profiled guiding section and adapted to be fixed to the at least one window lifter arm;

at least two stops molded in the profiled guiding section for engaging said one edge of such window pane during assembly;

at least two spaced apart clamping areas molded in the profiled guiding section and adapted to contact one side of the window pane;

at least two separate clamping jaws supported on the profiled guiding section, each clamping jaw being associated with an opposing different one of said at least two clamping areas, and being adapted to contact the other side of the window pane, the window pane being tensioned between the at least two clamping areas and the at least two clamping jaws; and a fastener connecting each clamping jaw to the profiled guiding section;

wherein each of the at least two separate clamping laws has two supporting points, one supporting point on one side on the profiled guiding section and the other supporting point on the other side on the window pane, and wherein the fastener engages between the two supporting points.

16. The device of claim 15, further comprising a spring mounted to one of the at least two spaced apart stops and adapted to contact the lower edge of the window pane during assembly.

17. The device of claim 15, wherein the fastener is located below one of the at least two spaced apart stops.

* * * * *